Oct. 27, 1959 J. T. DEARSTYNE 2,909,976
SELF-SETTING SHUTTERS WITH FLASH SYNCHRONIZATION
Filed Feb. 5, 1953

INVENTOR
JOHN T. DEARSTYNE
BY
ATTORNEY

United States Patent Office 2,909,976
Patented Oct. 27, 1959

2,909,976

SELF-SETTING SHUTTERS WITH FLASH SYNCHRONIZATION

John T. Dearstyne, Binghamton, N.Y., assignor to General Aniline & Film Corporation, New York, N.Y., a corporation of Delaware Application February 5, 1953, Serial No. 335,375

3 Claims. (Cl. 95—11.5)

This invention relates to photographic shutters and more particularly to simple self-setting, single-leaf shutters with built-in flash ignition switch.

Shutters of the above type have relatively few moving parts; consequently, it is difficult to incorporate a flash ignition switch which would properly synchronize the shutter with the time lag of the bulb. Heretofore, the swinging leaf or the release lever has been employed as part of the switching circuit. This has the drawback that the contact surface must necessarily be small, often inadequate to carry the ignition current of the bulb. To overcome this, the shutter leaf had to be made of heavier gauge material which, in turn, increased the mass of the shutter leaf, often adversely affecting normal operation.

It is a primary object of this invention to incorporate, in shutters of the type described, a flash ignition switch independent of the shutter leaf or the release lever.

It is a further object of this invention to provide a flash ignition switch, synchronized with the shutter operation, having a predetermined time advance so as to compensate for the lag of the flash bulb.

It is a particular feature of this invention that the switching mechanism employs the normal operating parts of the shutter with only slight modifications which are simple to manufacture.

Another feature of this invention is that the flash ignition moving contact is carried by the master member and cooperates with the shutter leaf pivot stud as the stationary contact.

Other objects and features will be apparent from the following description of the invention, pointed out in particularity in the appended claims and taken in connection with the accompanying drawing, in which:

Figure 1:
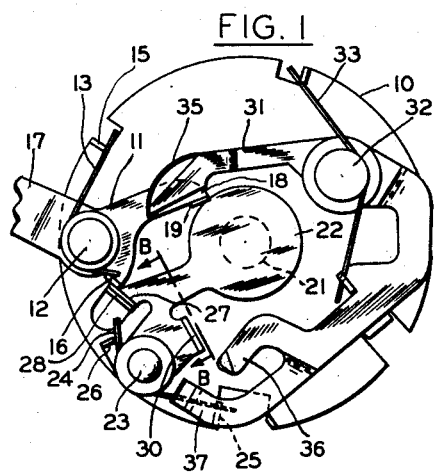
Figure 1 is a plan view of a self setting shutter in rest position incorporating the invention.

Referring to the figures, the operating elements of the shutter are shown mounted on a base plate 10 and consist of the shutter release trigger 11 pivoted over a stud 12 in the plate 10. The lever 11 is biased by the spring 13 which is wound around the stud 12 and tensioned between lug 15, formed of a bent up portion of the base plate 10 and lug 16 carried by the trigger 11. The latter has an outwardly extending arm 17 for the manual operation of the shutter and an inwardly extending toe portion 18 with a vertically extending lug 19 for the trigger action.

Centrally in the base plate 10, and covering the exposure aperture 21, is the shutter leaf 22 pivoted over the stud 23 carried by the base plate 10. A spring 24 is tensioned between lug 25 in the base plate 10 and lug 26 of the shutter leaf holding it in aperture covering position. There is provided a stop 27 on the leaf 22 which cooperates with a lug 28 in the base plate whereby the leaf is retained in closed position unless moved by the shutter mechanism. The leaf 22 is also locked in this position, the stop 27 being held against the lug 28 by the lug 16 of the trigger 11. Therefore, the shutter leaf cannot be moved unless the trigger is actuated.

Figure 3:
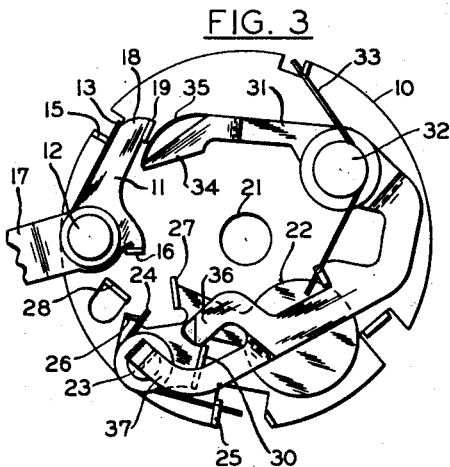
Figure 3 is a plan view of the same shutter at the instant of exposure opening.
Figure 4:
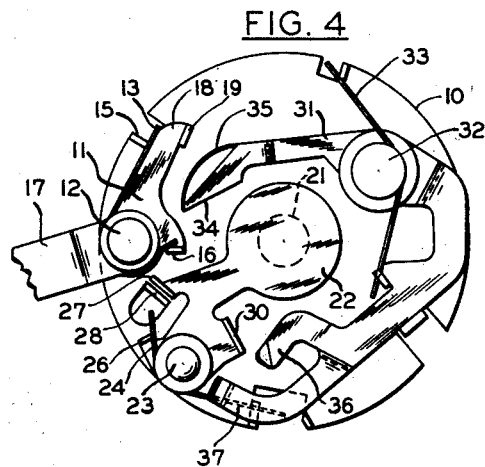
Figure 4 is a plan view of the shutter showing completion of the exposure and prior to resetting of the release trigger.
Figure 5:
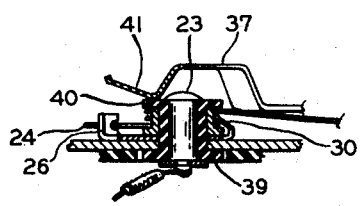
Figure 5 is a sectional view of the contact button and contact finger taken along lines A—A of Figure 2.

The shutter leaf 22 carries the actuating cam which extends vertically therefrom and is engaged by the arm 36 of the master member 31. The latter is pivoted over the stud 32 in the base plate 10 and is biased by the spring 33 in a manner similar to the other pivoted elements. The master member 31 is a V-shaped bell crank having an upper arm terminating in a straight edged portion 34 which engages the lug 19 of the toe 18 of the release trigger 11 and from which it can slip off when the trigger is fully depressed, as seen in Fig. 3. The portion 34 has a bent up part 35 under which the lug 19 may slide for reengagement with the upper arm. The lower arm of the master member 31 terminates in a forked end of which the shorter is the actuating arm 36 and the longer inwardly bent portion is the contact finger 37. The latter is shaped to have an upwardly extending bend and a downwardly extending V-shaped contact element 41 as seen in Figure 5. The finger 37 extends to a distance which brings the contact element 41 over the stud 23 when the master member 31 is actuated.

As will be seen, the stud 23 and the contact element 41 effect the actual electrical contact for synchronized flash ignition when the shutter is released. For this purpose the stud 23 is insulated from the base plate by means of the insulating bushing 39 as seen in Fig. 5 and an electrical conductor is affixed to its lower end. The contact element 41, which is part of the master member 31, is not insulated from the base plate 10 so that the latter forms the other or common terminal of the switch.

Figure 2:
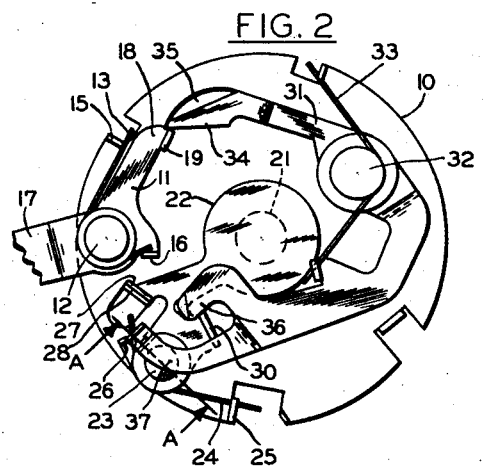
Figure 2 is a plan view of the same shutter in tensioned position about to be released.

In referring to the operation of the shutter, the figures may be inspected in sequential order. It is seen in Fig. 1 that the shutter leaf 22 is free from engagement and is covering the aperture 21. Now, if the arm 17 is depressed, the stud 19 of the toe 18 of the trigger 11 engages the edge 34 of the upper arm of the master member 31 and constrains the latter to move around the pivot. The actuating arm 36 of the master member 31 rides over the cam 30 and is lifted thereby until it engages the vertical side 42 of the cam as seen in Fig. 2. At this instant, the arm 36 drops but the trigger is still engaging the master member and the spring 33 is tensioned to move the master member as soon as the edge 34 slips off the lug 19.

Figure 6:
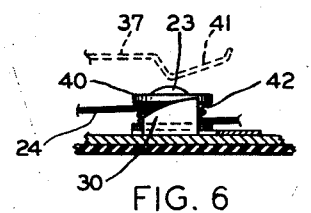
Figure 6 is a sectional view of the portion of the shutter as viewed along lines B—B of Figure 1.

As mentioned before, the cam 30, the shape of which is seen in Figure 6, lifts the actuating arm 36 of the master member. Consequently, the finger 37 and its contact element 41 clear the stud 23 and no electrical contact is established by the tensioning or cocking motion of the master member. Moreover, the finger 37 and its contact element 41 are so proportioned that in the position as shown in Fig. 2 when the actuating arm 36 is lowered into engagement with the inner cam surface 42, the contact element 41 rests on the flange 40 of the bushing 39 and no electrical contact is established until the trigger is further depressed whereby the upper arm of the master member slips off the toe 18 of the trigger, as seen in Fig. 3. The energy stored in the spring 33 will now move the shutter leaf 22, by virtue of the engagement of the arm 36 and the cam side 42, until the motion of the master member 31 progresses beyond the distance required for the arm 36 to be disengaged from the side 42 of the cam 30. When this occurs, the leaf 22 becomes free to return, by virtue of its spring loading, to closed position. The above sequence of operation provides a momentary uncovering, and subsequent covering, of the aperture by the shutter leaf 22 which is generally in the order of 1/25 or 1/50 of a second. During the exposure opening the contact element 41 wipes over the lug 23 and provides electrical contact for the time interval that the master member 31 is actuating the shutter leaf 22. It should also be noted that contact is established immediately when the master member 31 is released by the trigger, prior to sufficient motion of the leaf to fully uncover the exposure aperture. The wiping action of the contact 41 insures a continued, low resistant contact surface and, since the contact elements are formed from the normal shutter components, current carrying surfaces of high conductance may be obtained.

I claim:

1. In a self setting photographic shutter comprising a base plate having an exposure aperture, a shutter leaf pivoted over a stud in said plate and swingable past said aperture, a shutter release trigger and a master member, individual pivoted support in said plate for said trigger and for said member including spring biasing means holding them in rest position, said trigger having a toe portion in slip-off engagement with said master member, said leaf having a cam lifting said member upon setting movement into operative engagement for swinging said leaf upon return movement of said member, a flash ignition circuit including a resilient contact finger carried by said member and a contact button formed by said stud in said plate over and above which said finger travels upon setting movement of said member and in sliding engagement upon return movement of said master member for closing said circuit.

2. In a self setting photographic shutter comprising a base plate having an exposure aperture, a shutter leaf pivoted over a stud in said plate and swingable past said aperture, a shutter release trigger and a master member, individual pivoted supports in said plate for said trigger and for said member including spring biasing means holding them in rest position, said trigger having a toe portion in slip-off engagement with said master member, said leaf having a cam lifting said member upon setting movement into operative engagement for swinging said leaf upon return movement of said member, a flash ignition circuit including a resilient contact finger carried by said member and a contact button formed by said stud in said plate over and above which said finger travels upon setting movement of said member and in sliding engagement upon return movement of said master member for closing said circuit and means for electrically insulating said stud from said plate including an insulating bushing having a flange, said finger having a bent portion adapted to rest on said flange upon said master member being lowered in passing said cam whereby contact between said finger and said button is prevented until return movement of said member.

3. In a self setting photographic shutter comprising a base plate having an exposure aperture, a shutter leaf pivoted over a stud in said plate and swingable past said aperture, a shutter release trigger and a master member, individual pivoted supports in said plate for said trigger and for said member including spring biasing means holding them in rest position, said trigger having a toe portion in slip-off engagement with said master member, said leaf having a cam lifting said member upon setting movement into operative engagement for swinging said leaf upon return movement of said member, a flash ignition circuit including a resilient contact finger carried by said member and a contact button formed by said stud in said plate over and above which said finger travels upon setting movement of said member and in sliding engagement upon return movement of said master member for closing said circuit, said finger being so proportioned with respect to location of said button that contact is being established prior to said leaf uncovering said aperture thereby providing a time delay for flash exposure.

References Cited in the file of this patent

UNITED STATES PATENTS

| | | |
|---|---|---|
| 1,925,567 | Riddell | Sept. 5, 1933 |
| 2,145,917 | Boesser | Feb. 7, 1939 |
| 2,469,688 | Fuerst | May 10, 1949 |
| 2,480,604 | Pirwitz | Aug. 30, 1949 |
| 2,537,888 | Fuerst | Jan. 9, 1951 |
| 2,627,214 | Pirwitz | Feb. 3, 1953 |